Aug. 30, 1966    M. L. MARCUS    3,269,041
CERTIFICATE HOLDER
Filed Jan. 24, 1964    3 Sheets-Sheet 1

INVENTOR.
MORRIS L. MARCUS
BY Julius L. Rubinstein
ATTORNEY

Aug. 30, 1966

M. L. MARCUS 3,269,041

CERTIFICATE HOLDER

Filed Jan. 24, 1964

INVENTOR.
MORRIS L. MARCUS

BY *Julius L. Rubinstein*

ATTORNEY

Aug. 30, 1966 M. L. MARCUS 3,269,041
CERTIFICATE HOLDER
Filed Jan. 24, 1964 3 Sheets-Sheet 3
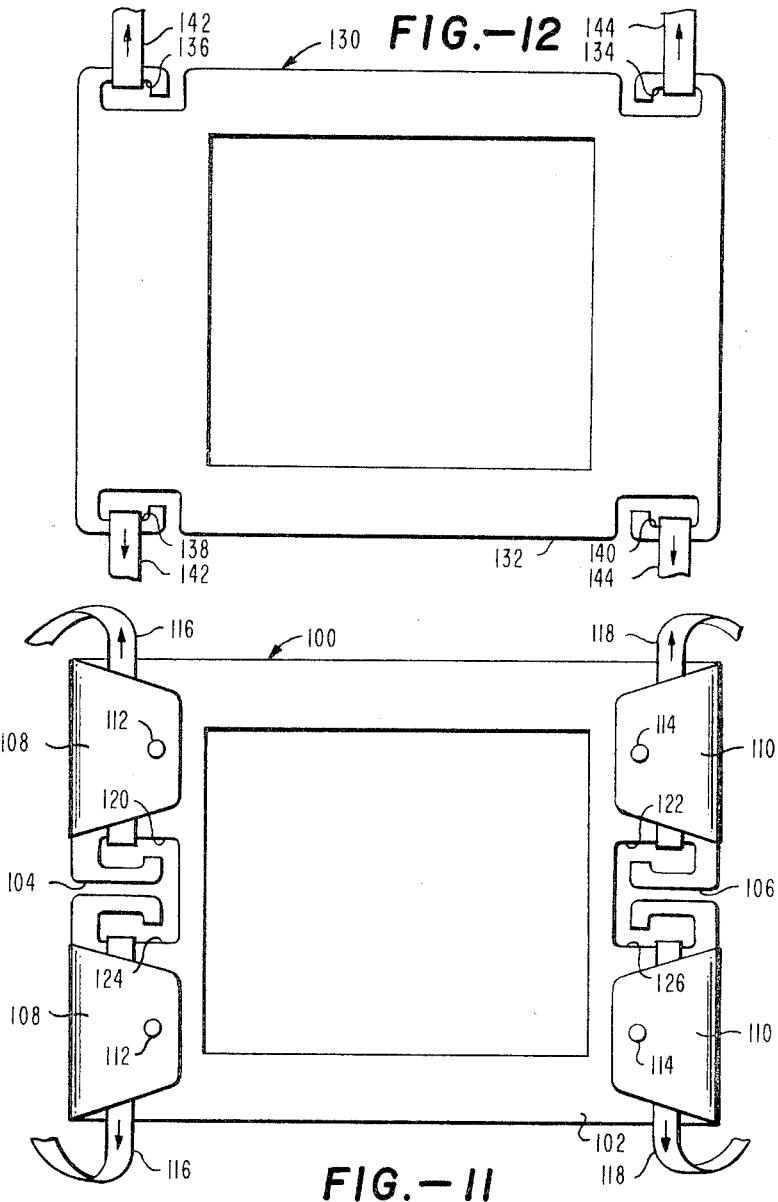
INVENTOR.
MORRIS L. MARCUS
BY
ATTORNEY

United States Patent Office 3,269,041
Patented August 30, 1966

3,269,041
CERTIFICATE HOLDER
Morris L. Marcus, Los Angeles, Calif.
(215 Peck Drive, Beverly Hills, Calif.)
Filed Jan. 24, 1964, Ser. No. 339,957
17 Claims. (Cl. 40—10)

This invention relates to a holder, and more particularly to a holder for identification certificates and the like, that are often required by state laws and city ordinances, to be carried and displayed upon motor vehicles.

Holders for identification certificates and the like, as exemplified by the patent to Cobbs 2,027,517 had certain undesirable features. For one thing they were costly to make. In addition the coil spring securing means used with these holders did not always fit properly around the steering wheel post of the vehicle because of the large variation in the diameter of the steering wheel posts in different model vehicles. As a consequence when the steering post was too small, the certificate holder could slide around on its surface, and when the steering wheel post was too large, the increased tension in the coil spring would distort and eventually tear the body of the certificate holder. Furthermore such certificate holders could not readily or satisfactorily be attached to the sun visor in vehicles. However, a need exists for a certificate holder which can be interchangeably attached to the steering post of a vehicle or the vehicle sun visor or other support.

Besides this, the design of such certificate holders was such that when installed, the force which the coil spring or resilient attaching member, exerted on the hook rivets or resilient member retaining part, was opposed only by the material or fabric composing the body of the certificate holder. As a consequence, when heat, cold, or moisture caused the body of the certificate holder to deteriorate, the force exerted by the coil springs or resilient attaching member on the hook rivets or retaining members pulled them out of the body of the certificate holder requiring a replacement of the certificate holder.

In addition economic considerations required the coil spring to be made from such inexpensive material that they deteriorate when subjected to temperature extremes and moisture. Since the coil springs or resilient retaining member in prior certificate holders was permanently attached to the body of the certificate holder, a failure in the coil spring or resilient retaining member also required a replacement of the entire certificate holder.

What is needed therefore and comprises an important object of this invention is to provide a certificate holder which can be installed interchangeably on the sun visor of a motor vehicle or around motor vehicle steering wheel posts of varying diameter.

A further object of this invention is to provide a certificate holder having a removable easily interchangeable elastic holder.

Yet another object of this invention is to provide a certificate holder utilizing removable interchangeable rubber band holders.

Yet another object of this invention is to provide a certificate holder having hook members secured thereon in association with removable resilient securing means, and designed in such a way that after installation on a support, the hook members exert little or no force on the body of the certificate holder.

Yet a further object of this invention is to provide a durable certificate holder which is simple and economical to make.

These and other objects of the invention will become more apparent when understood in the light of the specification and the accompanying drawings wherein:

FIG. 11 is a plan view of a sixth embodiment of a certificate holder constructed in accordance with the principles of this invention.

FIG. 12 is a plan view of a seventh embodiment of a certificate holder constructed in accordance with the principles of this invention.

Figure 1:
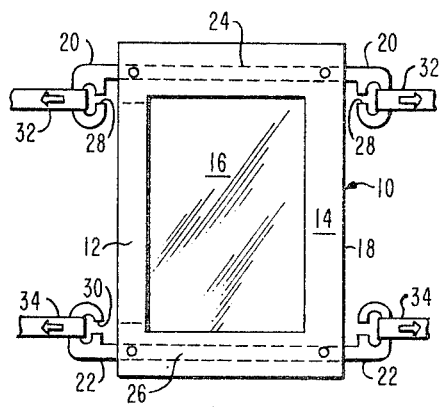
FIG. 1 is a plan view of one embodiment of a certificate holder constructed in accordance with the principles of this invention.

Referring now to FIG. 1 of the drawing, a certificate holder indicated generally by the reference numeral 10 comprises a frame-like body 12 formed from fabric, leather or other flexible material. The framelike body 12 may be formed in two thicknesses for retaining the certificate therein, and includes an inner thickness or ply serving as a backing and the outer ply 14 serving as the cover. As seen, the cover 14 is provided with a centrally disposed rectangular opening 16 in which a transparent plastic material may be removably or permanently mounted. The backing ply, not shown, is sewed to the cover ply 14 on three edges of the body 12 so that the unsewn edge 18 serves as an entrance for insertion of the identification certificate in a manner well-known in the art. It is however to be understood that the means for holding the identification certificate on the holder described above is exemplary, and other means for holding the identification certificate on the holder are contemplated.

To this point the structure of the body of the certificate holder is not critical to the practice of this invention. However, two pairs of ear hooks 20 and 22 are riveted, glued or otherwise attached to the body 12 of the certificate holder 10 by any suitable means. It is noted that the pair of ear hooks 20 can be stamped out of a single piece of sheet metal or other suitable flexible material with a common central connecting portion 24. Similarly the pair of ear hooks 22 may have a common central connecting portion 26. The ear hooks 20 are provided with an entrance portion 28 and the ear hooks 22 are provided with an entrance portion 30. The opposed ends of an ordinary rubber band 32 are inserted through the entrance portions 28 into the pair of ear hooks 20 while the opposed ends of another ordinary rubber band 34 is inserted in the entrance portions 30 of the ear hooks 22.

Figure 4:
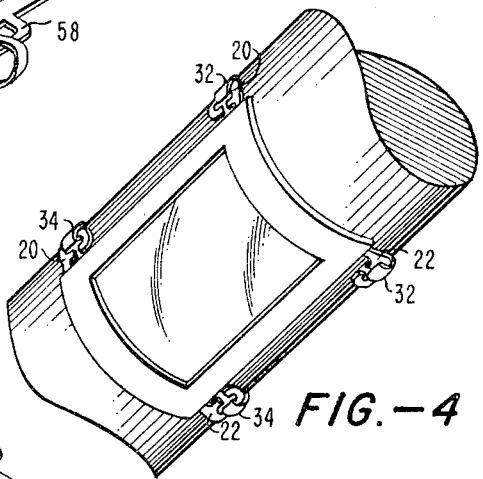
FIG. 4 is a perspective view of a certificate holder constructed in accordance with the embodiments shown in FIGS. 1 to 3, mounted on an automobile steering post.
Figure 6:
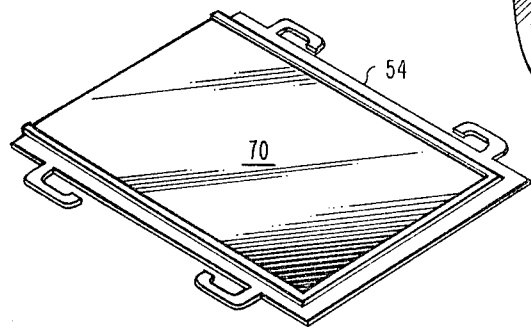
FIG. 6 is a perspective view of a mirror mounted on a supporting frame constructed in accordance with the principles of this invention.

In use the identification certificate is inserted in the body 12 of the certificate holder 10 through the entrance edge 18. Next the looped end of rubber band 32 is inserted in one of the ear hooks 20 and the remainder of the rubber band is pulled around a steering wheel column or a sun visor until its opposite end is hooked into the ear hook 20 on the opposed edge of the body, as shown in FIG. 1. Similarly one end of a rubber band 34 is inserted in the entrance portion 30 of ear hook 22 and the remainder of the rubber band is pulled around a steering wheel column or a sun visor until its opposite end can be hooked into the ear hook 22 on the opposite side of the certificate holder, see FIGS. 4 and 5.

When this is done, as seen in FIG. 1, the force exerted by the rubber bands 32 and 34 or other resilient elements on the pairs of ear hooks 20 and 22 will be oppositely directed. Since the pairs of ear hooks 20 and 22 are connected by central connecting portions 24 and 26, the force exerted by the rubber bands 32 and 34 on the body 12 will be substantially neutralized. As a result the material composing the body 12 of the certificate holder will not be under stress and the body of the certificate holder can be made of a less expensive material. In addition, environment caused deterioration of the body of the certificate holder will not cause the pairs of ear hooks 20 and 22 to pull away from the body 12.

If the rubber bands 32 or 34 should ever fail, it is a simple matter to remove them from the certificate holder and replace them by another rubber band. In addition it is apparent that the size of the rubber band can be selected to conform with the diameter of the steering wheel column or the size of the sun visor.

Figure 2:
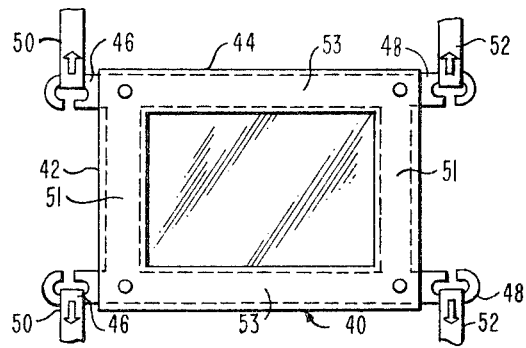
FIG. 2 is a plan view of a second embodiment of a certificate holder constructed in accordance with the principles of this invention.

Another embodiment of a certificate holder constructed in accordance with this invention is shown in FIG. 2 wherein the certificate holder 40 has a body 42 constructed like the body 12 of the certificate holder 10 shown in FIG. 1. The body 40, by way of example, may be formed in two plies and with an entrance edge 44 for the reception of the identification certificate as explained in connection with the embodiment shown in FIG. 1. In addition, the certificate holder 40 is provided with pairs of ear hooks 46 and 48. In this embodiment however the pairs of ears 46 and 48 are stamped out of a single piece of sheet metal or other suitable flexible material, and are provided, as shown, with connecting portions 51 and 53 to form a generally rectangular hook frame.

This arrangement eliminates alignment step which was present in the embodiment shown in FIG. 1. In the embodiment shown in FIG. 2, all that is necessary is to rivet or otherwise fasten the pairs of ear hooks 46 and 48 to the body 42 of the certificate holder in a single operation. In contrast, in the embodiment shown in FIG. 1, it is necessary to make certain that the connecting portions 24 and 26 of the pairs of ear hooks 20 and 22 are generally parallel to each other.

In use the ends of rubber bands 50 and 52 of suitable length are inserted in the pairs of ears 46 and 48, as shown in FIG. 2, and are passed around a steering wheel post or sun visor as explained in connection with the embodiment shown in FIG. 1. It should further be noted that the forces exerted by the rubber bands 50 and 52 on the certificate holder are not transmitted to the body 42 of the certificate holder but instead are substantially neutralized by the connecting portions 51 and 53.

Figure 3:
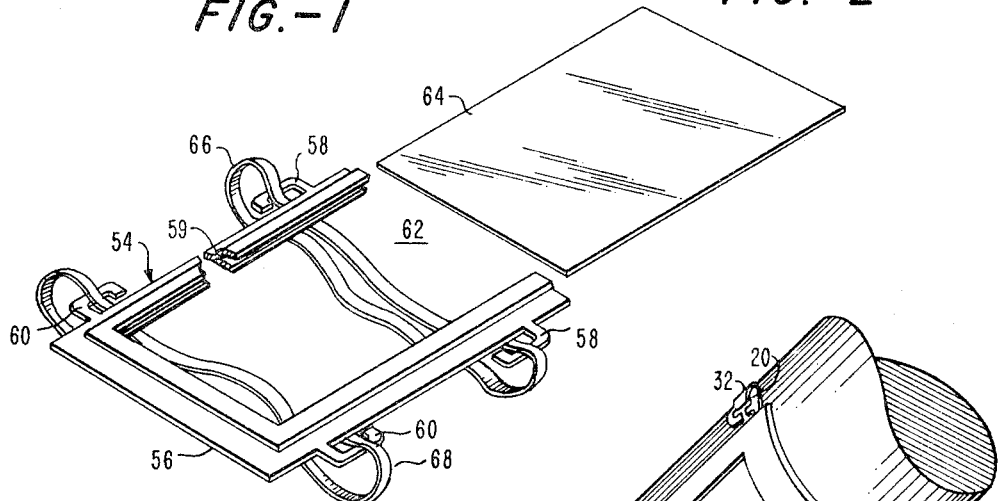
FIG. 3 is an exploded perspective view of a third embodiment of a certificate holder constructed in accordance with the principles of this invention.

Another embodiment of a certificate holder constructed in accordance with the principles of this invention is shown in FIG. 3 wherein the certificate holder 54 includes a body 56. In this case the body 56 along with pairs of ear hooks 58 and 60 are stamped out of a single piece of sheet metal or other suitable material. As seen, the body 56 includes a raised portion which define a pair of grooves 59. The body 56 comprises three sides of a rectangle, leaving the fourth side 62 open and serving as an entrance portion for a transparent plastic envelope 64. Rubber bands 66 and 68 are inserted in the pairs of ear hooks 58 and 60 as shown in FIG. 3.

In use the identification certificate shown in FIG. 3 is first inserted in the plastic envelope 64. The envelope 64 is then inserted in the grooves 59 defined by the raised portion of the certificate holder 54. If desired the envelope 64 may be provided with clips, or other retaining means to more securely fasten the envelope 64 in the grooves 59 of the body 56. The certificate holder 54 may then be installed on a steering post or a sun visor in the same manner, as the certificate holders shown in FIGS. 1 and 2.

Figure 5:
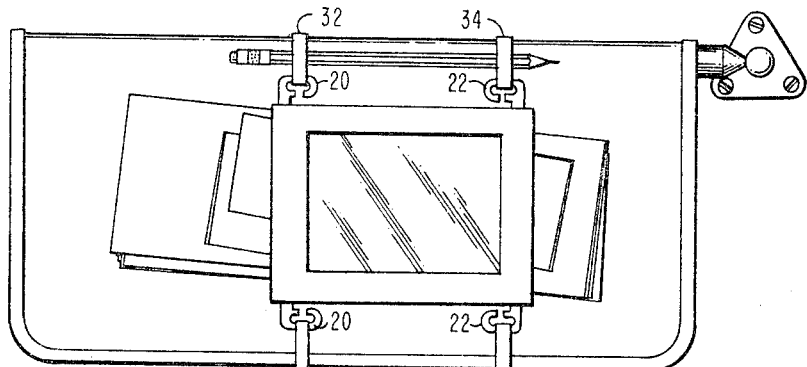
FIG. 5 is a perspective view of a certificate holder constructed in accordance with the embodiments shown in FIGS. 1 to 3 mounted on a sun visor in a vehicle.

Alternatively instead of inserting a plastic envelope 64 in the grooves 59 formed in the body 56 of the certificate holder 54, a glass or polished stainless mirror 70 could be inserted in these grooves so that the holder 54 could serve as a means for retaining a mirror on the sun visor of the car. It is also to be understood that although the principles of this invention have been described as relating to a certificate holder, the body portion of each embodiment shown in the drawings could be designed to hold mirrors or other objects in a convenient place on the sun visor of a vehicle. Further, as shown in FIG. 5, the rubber bands 32 and 34 which are passed around the sun visor could also be used to retain other materials such as pencils, papers and maps on the sun visor, on either side thereof.

Figure 7:
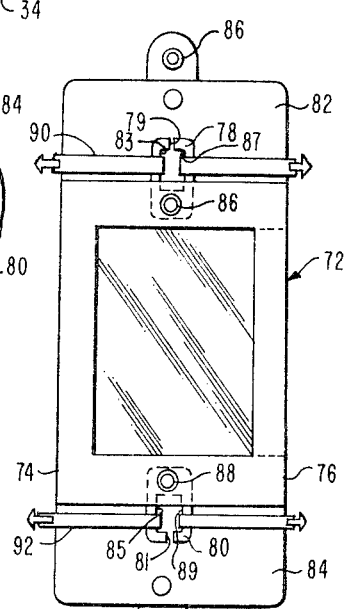
FIG. 7 is a plan view of a fourth embodiment of a certificate holder constructed in accordance with the principles of this invention.

Another embodiment of a certificate holder constructed in accordance with the principles of this invention is shown in FIG. 7, wherein a certificate holder 72 comprises a body 74 formed from some flexible plastic, leather, or other suitable materials. The body 74, by way of example, is formed in two plies with one unsewn edge 76 of the body serving as an entrance edge for the identification certificate as described in connection with the embodiments shown in FIGS. 1 and 2. In addition hook member 78 and 80 having entrance slots 79 and 81 extend from the body 74 as shown. The body 74 is also provided with folding flaps 82 and 84 which are designed to be folded over the hook members 78 and 80 and retained in a folded condition by means of snaps 86 and 88.

Figure 8:
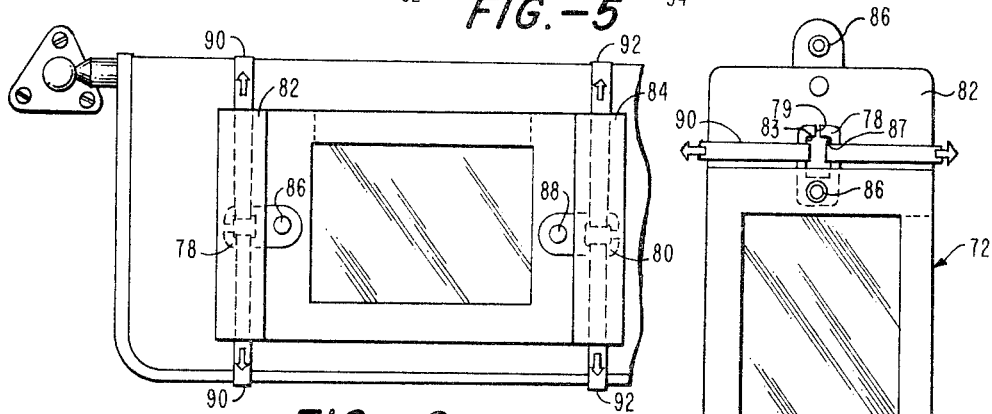
FIG. 8 is a perspective view of the certificate holder shown in FIG. 7 mounted on an automobile sun visor.
Figure 9:
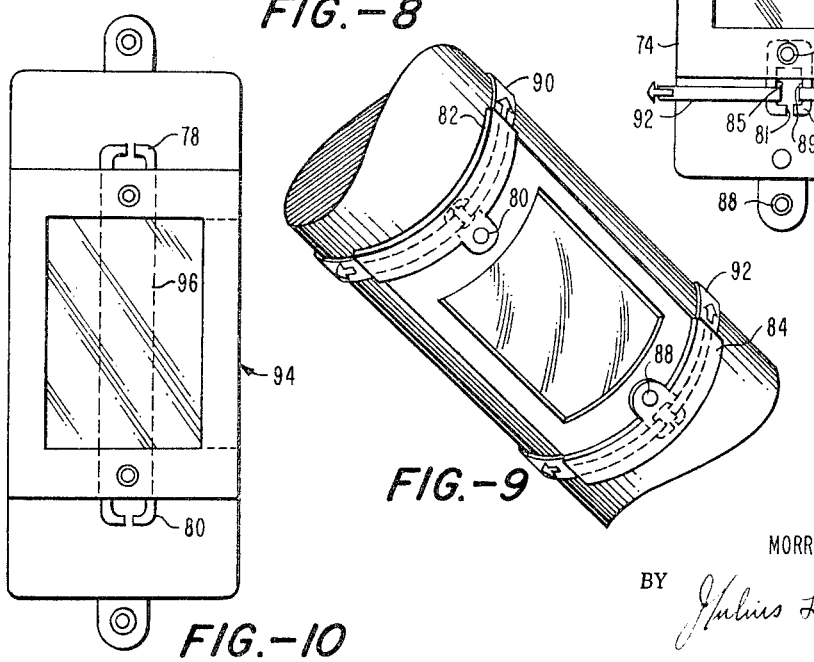
FIG. 9 is a perspective view of the certificate holder shown in FIG. 7 mounted on an automobile steering post.

In use the ends of rubber bands 90 and 92 are inserted in the hook members 78 and 80 through entrance slots 79 and 81 and are held against edges 83 and 85. Then the remaining portion of the rubber bands are stretched around a steering post or sun visor until the opposite ends of the rubber bands can again be inserted in slots 79 and 81 and bear against the opposite facing edges 87 and 89 in the ear hook members, see FIGS. 7, 8 and 9. Next the flaps 82 and 84 are folded over the hook members and snapped closed as shown in the drawings. It will further be noted that in this embodiment, just as in all the other embodiments, the force exerted by the rubber bands or other resilient retaining elements on the hook or ear members 78 and 80 is neutralized insofar as the body of the certificate holder is concerned so that the body of the certificate holder is not under any stress. As a result, even if the body 74 of the certificate holder should deteriorate, the force exerted by the rubber bands would not cause the hook members to pull away from the body.

Figure 10:
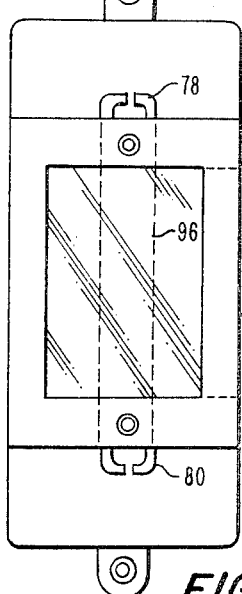
FIG. 10 is a plan view of fifth embodiment of a certificate holder constructed in accordance with the principles of this invention.

The certificate holder 94 shown in FIG. 10 is identical to the certificate holder shown in FIG. 7 except that the ear or hook members 78 and 80 are formed from sheet metal or other suitable material and are provided with an integral connecting portion 96. The advantage of the embodiment shown in FIG. 10 over the embodiment shown in FIG. 7 is that it eliminates the step of aligning the position of the ear or hook members 78 or 80. In FIG. 10 when the ear hooks 78 and 80 along with the connecting strip 96 are secured to the body of the certificate holder, the ear hooks 78 and 80 extend in opposite direction on the certificate holder. In contrast the ear or hook members 78 and 80 in the embodiment shown in FIG. 7 must be separately centered on the body of the certificate holder.

To this point, the holders shown in FIGS. 1, 2, 3, 7 and 8 have been described as utilizing ear hooks for anchoring the ends of the rubber bands used to secure the body of the holder to the vehicle. It is however to be understood that the principles of this invention can be practiced using appropriately shaped slots formed in the edges of the frame of the holder to serve as hooks or anchors for the rubber bands.

In particular the certificate holder indicated generally by the reference numeral 100, in FIG. 11 comprises a generally rectangular unitary frame 102 stamped from flexible sheet metal or formed from other suitable material. Suitable means, not shown, are provided for holding the certificate on the certificate holder. Slots 104 and 106, which in this particular embodiment are generally E-shaped are formed on opposite sides of frame 102, as shown. In addition, the opposite sides of the frame may be provided with pairs of flaps 108 and 110 which can be maintained in a folded position by means of snaps 112 and 114.

In use rubber bands 116 and 118 are inserted in hte slots 104 and 106 so that one looped end of each rubber band bears against slot edges 120 and 122. The opposite looped ends of these rubber bands are stretched around a steering column or sun visor of a motor vehicle and are reinserted in the slots 104 and 106 so they bear against facing slot edges 124 and 126 as shown. Flap pairs 108 and 110 may then be folded over the rubber bands and snapped in a folded position to hold the rubber band in place and conceal the rubber bands and enhance the appearance of the certificate holder. By designing the certificate holder with a unitary frame the force exerted by the rubber bands 116 and 118 on the frame 102 is neutralized. In other respects the certificate holder is used in the same manner as described in the other embodiments.

The certificate holder indicated generally by the reference numeral 130 in FIG. 12, comprises a generally rectangular unitary frame 132 stamped out of sheet metal or formed from some other suitable material. In addition, suitable means, not shown, are provided for retaining the certificate on the certificate holder. In this embodiment, slots 134, 136, 138, and 140 are formed in the frame adjacent the corners thereof as shown. Slots 136 and 138 are designed to removably receive the looped ends of rubber band 142, and slots 134 and 140 are designed to removably receive the looped ends of rubber band 144. In all other respects the certificate holder 130 may be attached to the steering post or sun visor of a motor vehicle, as described in connection with the embodiments of the certificate holder described above, and the force exerted by the rubber bands 142 and 144 on the unitary frame will be neutralized.

It is contemplated changes may be made in the construction and arrangement of the certificate holders described above without departing from the spirit and purpose of this invention and it is intended that the claims cover any modified form or structure or use of mechanical equivalent.

In the claims:

1. A holder comprising a generally rectangular body, retaining means on said body for retaining an article thereon, a generally rectangular hook frame attached to the body, hooks integrally formed with said hook frame on edges thereof, said hooks shaped to removably retain resilient closed loop attaching means whereby the holder can be removably attached to a support by hooking one end of said closed loop attaching means to one hook on one edge of the hook frame and stretching the resilient closed loop attaching means around the support and hooking the opposite end of said closed loop attaching means to a hook on another edge of the hook frame, said hook frame and said hooks shaped so when said holder is mounted on the support with said closed loop attaching means hooked onto said hooks, the force exerted on said hook frame by said closed loop attaching means is neutralized so that the closed loop attaching means exerts no tension on the body of the holder.

2. The holder described in claim 1 wherein said hooks comprise slots formed in the hook frame.

3. The holder described in claim 1 wherein said attaching means comprises a pair of rubber bands.

4. A holder comprising a generally rectangular frame-like body with one side of the retangular frame missing and serving as an entrance for an article to be mounted thereon, oppositely positioned hooks integrally formed with said frame-like body and disposed on opposite edges of said body, said body having means thereon for receiving and retaining said article on said body, said hooks shaped to removably retain resilient closed loop attaching means whereby the holder can be removably attached to a support by hooking one end of said closed loop attaching means to one hook adjacent one edge of the body and stretching the closed loop attaching means around the support and hooking the opposite end of said closed loop attaching means to a hook on the opposite edge of the body, whereby when said holder is mounted on said support the force exerted on said hooks by said closed loop attaching means is neutralized so that the attaching means exerts no tension on the framelike body of the holder.

5. The holder described in claim 4 wherein said means for retaining and receiving said article on said body comprises grooves formed in said framelike body.

6. The holder described in claim 5 wherein said article is a plastic transparent envelope for holding an identification certificate therein.

7. The holder described in claim 5 wherein said article is a rectangular mirror.

8. A holder comprising a generally rectangular body, retaining means on said body for retaining an article thereon, hooks on said body, each hook having opposed facing edges, and shaped to removably retain a resilient closed loop attaching means, each hook adapted to be associated with a resilient closed loop attaching means whereby the holder can be removably attached to a support by hooking one edge of one closed loop attaching means so that it bears against one edge of a hook and stretching the resilient closed loop attaching means around a support and hooking the opposite end of said loop attaching means to said hook so that it bears against the opposed facing edge of said hook and repeating this for the hook on the opposite edge of the body, said opposed facing edges of said ear hooks connected together in such a way that when said holder is mounted on the support with said closed loop attaching means bearing against said opposed edges of said hooks, the force exerted on said ear hook by said closed loop attaching means is neutralized so that the closed loop attaching means exerts no tension on the body of the holder.

9. The holder described in claim 8 wherein said hooks comprise slots formed in the sides of the body of the holder.

10. The holder described in claim 8 including foldable end flaps and fastening means formed on the opposite sides of the body of the holder, whereby the end flaps can be held in a folded position to cover said ear hooks and said resilient closed loop attaching means attached thereto.

11. The holder described in claim 8 wherein each resilient closed loop attaching means comprises a rubber band.

12. A holder comprising a generally rectangular body, retaining means on said body for retaining an article thereon, hook means on said body, said hook means having opposed facing edges, each edge shaped to removably retain a resilient closed loop attaching means, said hook means being operatively associated with a resilient closed loop attaching means whereby the holder can be removably attached to a support by hooking one end of said closed loop attaching means so that it bears against one edge of said hook means and stretching said closed loop attaching means around a support and hooking the opposite end of said loop attaching means to said hook means so that it bears against the opposed facing edge of said hook means, said opposed facing edges of said hook means being connected together in such a way that when said holder is mounted on the support with said closed loop attaching means bearing against said opposed edges of said hook means, the force exerted on the opposed facing edges of said hook means by said closed loop attaching means is neutralized so that the closed loop attaching means exerts no tension on the body of the holder.

13. The holder described in claim 12 wherein the resilient closed loop attaching means comprises a rubber band.

14. A holder comprising a generally rectangular body, retaining means on said body for retaining an article thereon, hook means on said body comprising a central connecting portion having a hook portion at each end thereof, said hook portions being in the plane of said central connecting portion with their operative edges extending substantially normal to the axis of said central connecting portion, and resilient attaching means operatively associated with said hook means with its opposite ends adapted to be hooked over said spaced apart hook portions, whereby when said holder is mounted on a support with said resilient attaching means bearing against the opposed edges of said hook portions, the force exerted on said hook means by said resilient attaching means is neutralized so that the resilient attaching means exert no tension on the body of the holder.

15. The holder described in claim 14 wherein the hook portions of the hook means are generally C-shaped in configuration.

16. The holder described in claim 14 wherein the resilient attaching means is a rubber band.

17. The holder described in claim 15 wherein the resilient attaching means is a rubber band.

References Cited by the Examiner
UNITED STATES PATENTS

| | | | |
|---|---|---|---|
| 1,567,337 | 12/1925 | Siever | 40—129 |
| 2,027,517 | 1/1936 | Cobbs | 40—10 |
| 2,094,210 | 9/1937 | Craben | 40—21 |
| 2,916,838 | 12/1959 | Campbell | 40—129 |

FOREIGN PATENTS

| | | |
|---|---|---|
| 560,623 | 4/1944 | Great Britain. |

EUGENE R. CAPOZIO, *Primary Examiner.*

W. J. CONTRERAS, *Assistant Examiner.*